United States Patent
Roman et al.

(10) Patent No.: US 6,241,366 B1
(45) Date of Patent: Jun. 5, 2001

(54) LIGHTING SYSTEM WITH DIFFUSING DIMMER

(75) Inventors: Brian P. Roman; Mikhail A. Dubinovskiy, both of Austin, TX (US)

(73) Assignee: High End Systems, Inc., Austin, TX (US)

( * ) Notice: Subject to any disclaimer, the term of this patent is extended or adjusted under 35 U.S.C. 154(b) by 0 days.

(21) Appl. No.: 08/868,796

(22) Filed: Jun. 4, 1997

(51) Int. Cl.[7] ........................................ F21V 9/00
(52) U.S. Cl. .................. 362/293; 362/277; 362/281; 362/284; 362/321; 362/322
(58) Field of Search .................. 362/277, 280, 362/281, 282, 283, 284, 293, 321, 322

(56) References Cited

U.S. PATENT DOCUMENTS

| | | | |
|---|---|---|---|
| 876,944 | 1/1908 | Corey | 362/281 |
| 2,133,608 | 10/1938 | Engelken | 362/324 |
| 3,307,028 | 2/1967 | Bentham | 362/281 |
| 4,225,908 | * 9/1980 | Small, Jr. | 362/293 |
| 4,350,417 | 9/1982 | Freeman | 362/321 |
| 4,464,708 | * 8/1984 | Nussli et al. | 362/300 |
| 4,984,143 | 1/1991 | Richardson et al. | 362/282 |
| 5,053,934 | * 10/1991 | Krebs | 362/281 |
| 5,289,350 | 2/1994 | Gehrt | 362/281 |
| 5,371,655 | 12/1994 | Murdock et al. | 362/323 |
| 5,483,424 | * 1/1996 | Lightbody | 362/17 |
| 5,515,254 | * 5/1996 | Smith et al. | 362/293 |
| 5,580,164 | * 12/1996 | Maddox et al. | 362/293 |
| 5,665,305 | * 9/1997 | Bellveau et al. | 362/268 |
| 5,758,955 | * 6/1998 | Bellveau | 362/293 |

FOREIGN PATENT DOCUMENTS

| | | |
|---|---|---|
| 701801 | 1/1954 | (GB) . |
| 755275 | 1/1956 | (GB) . |

OTHER PUBLICATIONS

High End Systems, Inc Cyberlight Brochure—The Ultimate Power Tool featuring CYM Color Mixing.

* cited by examiner

*Primary Examiner*—Stephen Husar
*Assistant Examiner*—John Anthony Ward

(57) ABSTRACT

A diffusing dimmer includes an arm formed of non-transparent material and having a first end and a second end. The first end includes a mounting attachment. An extension portion of light diffusing material is connected to the second end and extends outwardly from the second end to a terminal edge formed in the light diffusing material. A pair of diffusing dimmer arms may be mounted in a light fixture movable toward each other in overlapping relationship to gradually diffuse and eventually block a light beam which projects lighting effects from the fixture. Also, rapid movement of the arms provides a strobing effect.

21 Claims, 15 Drawing Sheets

US 6,241,366 B1

LIGHTING SYSTEM WITH DIFFUSING DIMMER

FIELD OF THE INVENTION

This invention relates generally to stage and theater lighting fixtures and more particularly to a color wash luminaire which provides mechanical dimming to change light intensity and improve the uniformity of the dimming effect.

BACKGROUND OF THE INVENTION

Wash lights, as they are generally known, are used to provide uniform illumination and coloration to a theatrical set. Halogen lamps are often used in such lights. Halogen lamps have the advantage of controlled dimming but the disadvantage of more heat output than some other lamp types. Mechanical dimming can also be used with lamps which do not have controlled dimming.

Conventional mechanical dimming typically utilizes non-transparent elements which close or reduce the beam size to create a dimming effect. An undesirable side effect of this is that the dimming results in non-uniform intensity across the light beam caused by the non-transparent elements. Thus, a profile of the shape of the elements is revealed by their projected shadow, and this effect is at its worst when the elements are almost completely closing off the beam.

The foregoing illustrates limitations of the known prior art. Thus it is apparent that it would be advantageous to provide alternatives directed to overcoming one or more of the limitations as set forth above. Accordingly, suitable alternatives are provided including features and benefits more fully disclosed hereinafter.

SUMMARY OF THE INVENTION

In one aspect of the present invention this is accomplished by providing a diffusing dimmer apparatus comprising an arm formed of non-transparent material and having a first end and a second end, the first end having a mounting attachment. An extension portion of light diffusing material is connected to the second end and extends outwardly from the second end to a terminal edge formed in the light diffusing material.

In another aspect of this invention, this is accomplished by providing a diffusing dimmer apparatus mounted on the support and movable between first and second positions, the dimmer including at least one arm formed of non-transparent material and having a mounting attachment at a first end and a scalloped edge formed at a second end, an edge portion of light diffusing material connected to the second end overlaying the scalloped edge and extending outwardly from the scalloped edge and terminating at another scalloped edge formed in the diffusing material.

In still another aspect of this invention, this is accomplished by providing a light fixture having a diffusing dimmer apparatus comprising a lamp operably mounted in the fixture and provided to project a beam of light, a plurality of color wheels mounted in the fixture, a support plate mounted adjacent the color wheels, the plate having an opening whereby the beam passes through the color wheels, a diffusing dimmer mounted for movement between first and second positions, one of the positions being a position wherein the dimmer covers the opening, the dimmer including first and second arms movable toward each other in overlapping relationship, each arm being formed of non-transparent material having a mounting attachment at a first end and a scalloped edge formed at a second end, and an edge portion formed of light diffusing material connected to the second end overlaying the scalloped edge and extending outwardly from the scalloped edge and terminating at another scalloped edge formed in the diffusing material.

In an further aspect of this invention, this is accomplished by providing a moving light fixture comprising a yoke, means for movably suspending the yoke from a support, a housing movably connected to the yoke, the housing having a first portion including a light source and means for removing heat generated from the light source, and a second portion including a plurality of moving color filters, a plurality of lens devices, the light source being operable to project a beam of light along a path through the color filters and the lens devices, a diffusing dimmer mounted adjacent the path, the diffusing dimmer including at least one arm movable to a position blocking the light beam, the arm formed of a non-transparent material and having a mounting attachment at a first end and a scalloped edge formed at a second end, and an edge portion formed of light diffusing material connected to the second end overlaying the scalloped edge and extending outwardly from the scalloped edge and terminating at another scalloped edge formed in the diffusing material.

The foregoing and other aspects will become apparent from the following detailed description of the invention when considered in conjunction with the accompanying drawing figures. It is to be expressly understood, however, that the figures are not intended as a definition of the invention but are for the purpose of illustration only.

BRIEF DESCRIPTION OF THE DRAWING FIGURES

Figure 10:
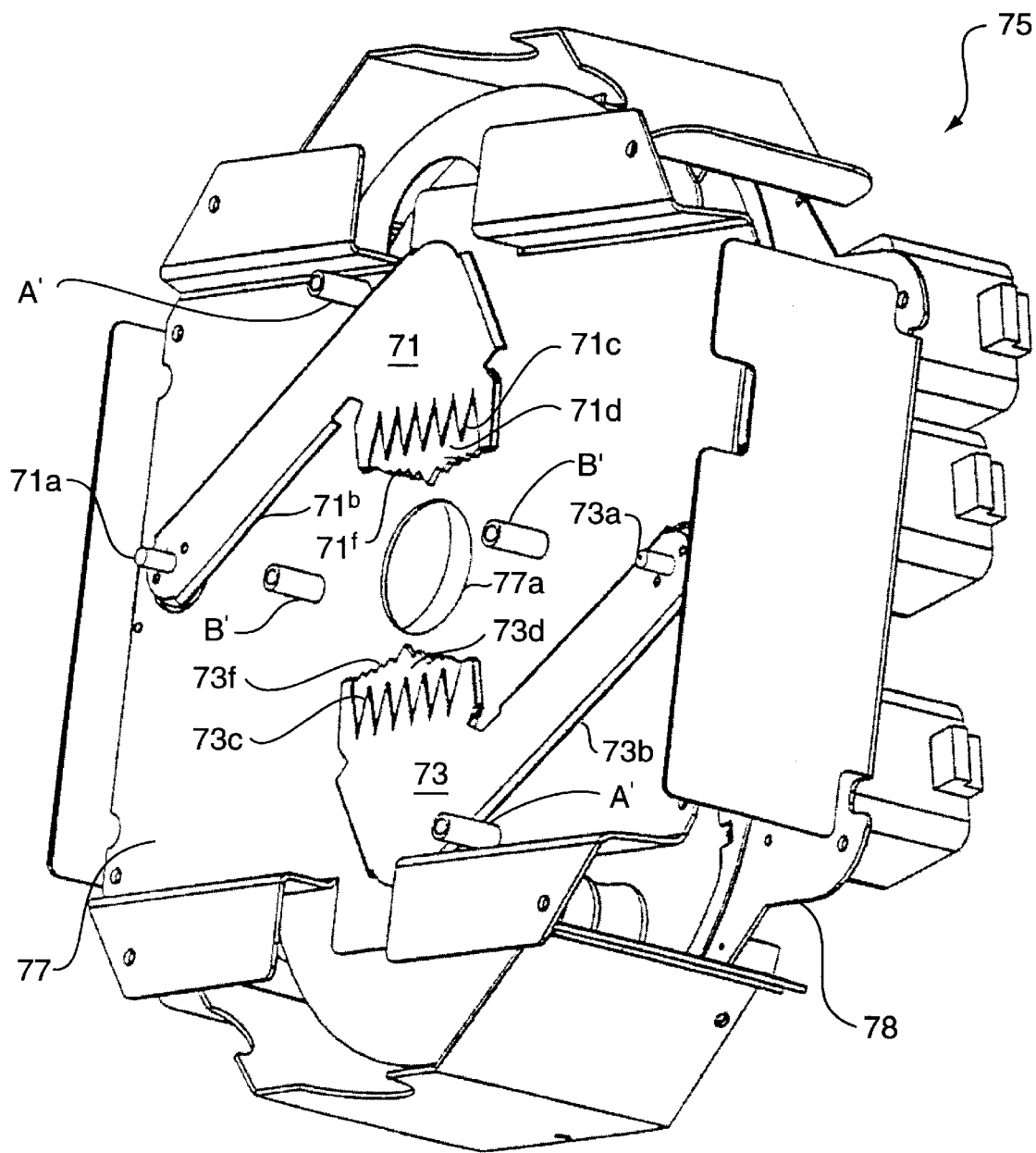
Figure 11:
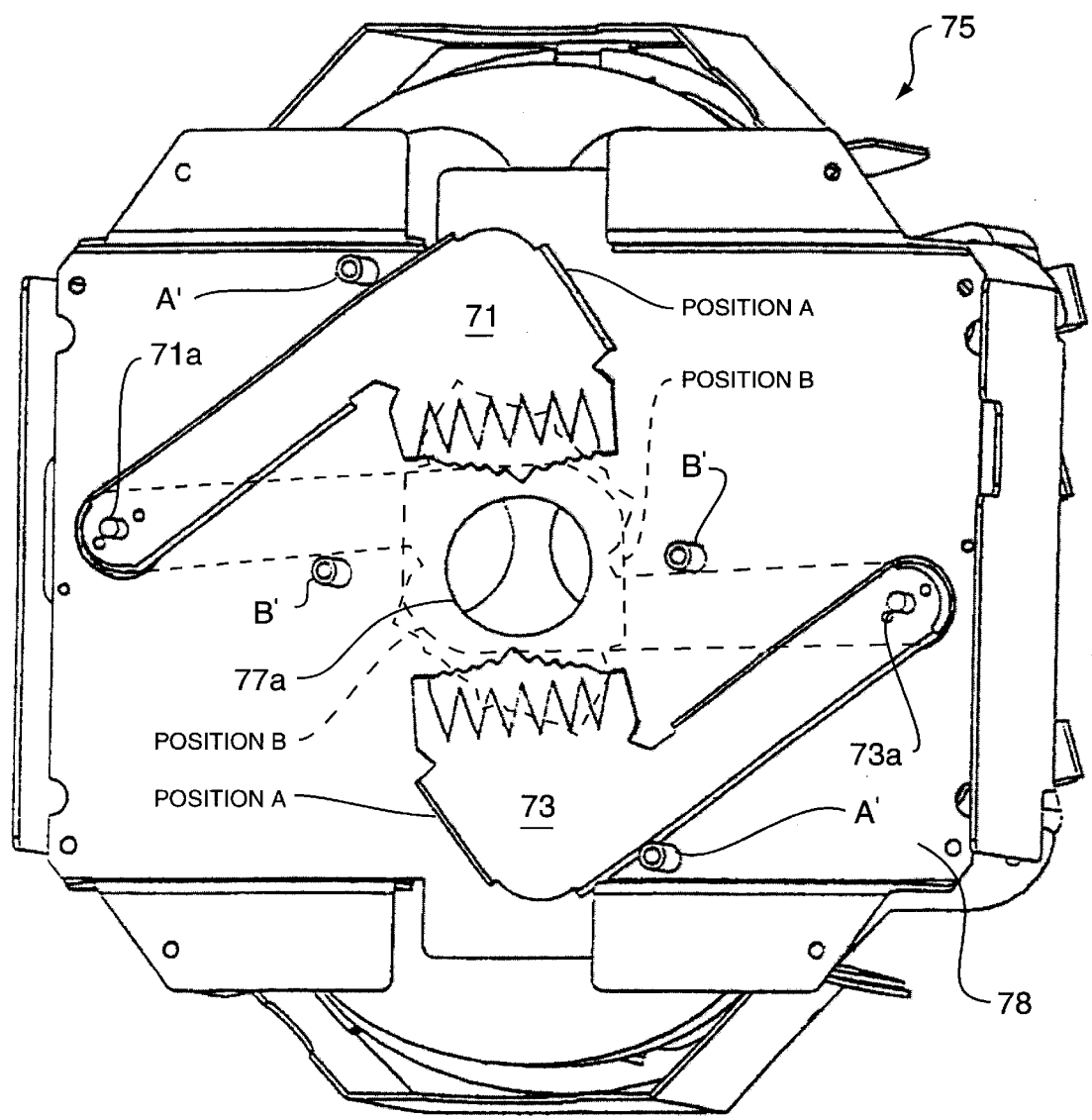
Figure 12:
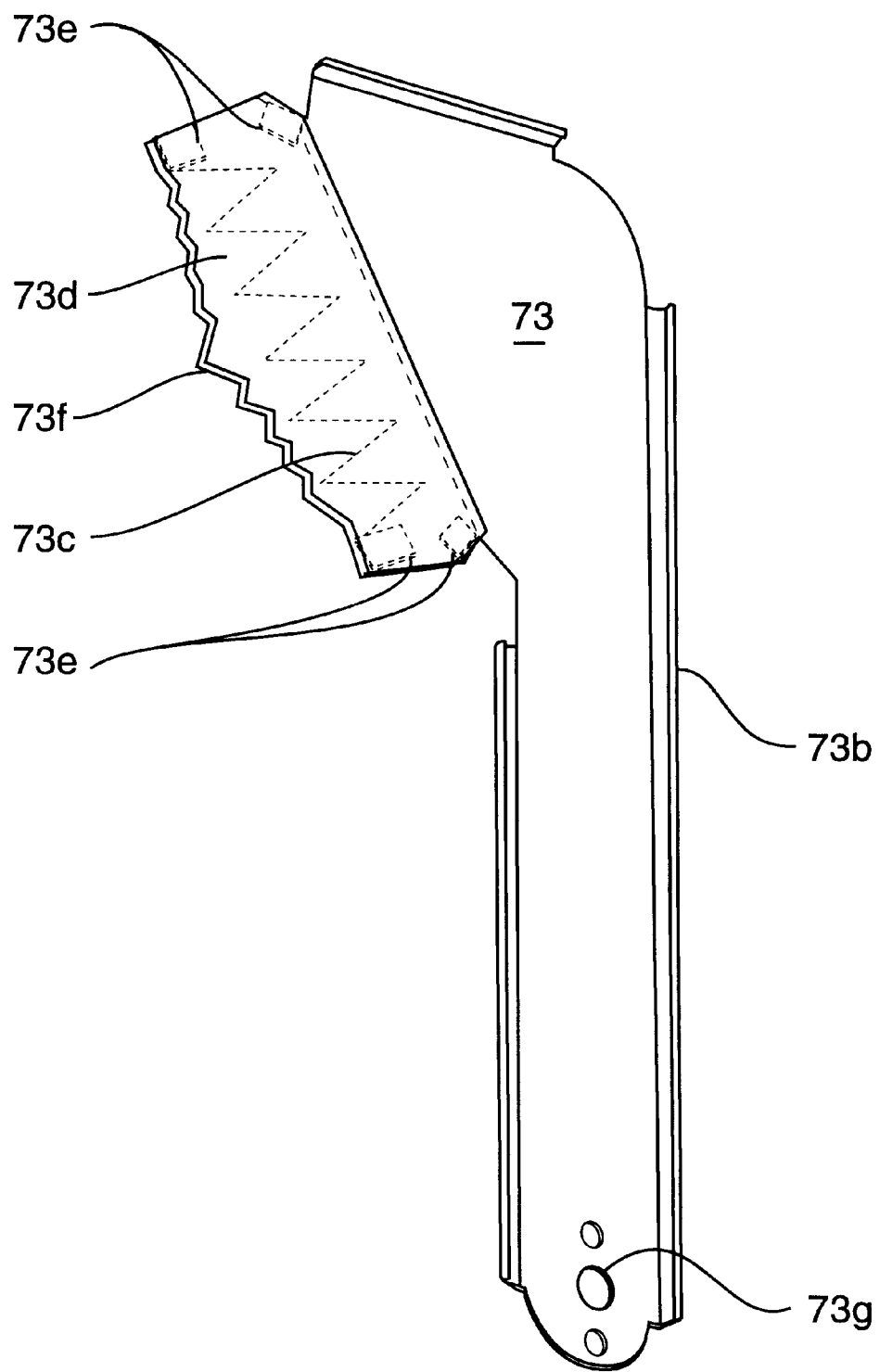
Figure 13:
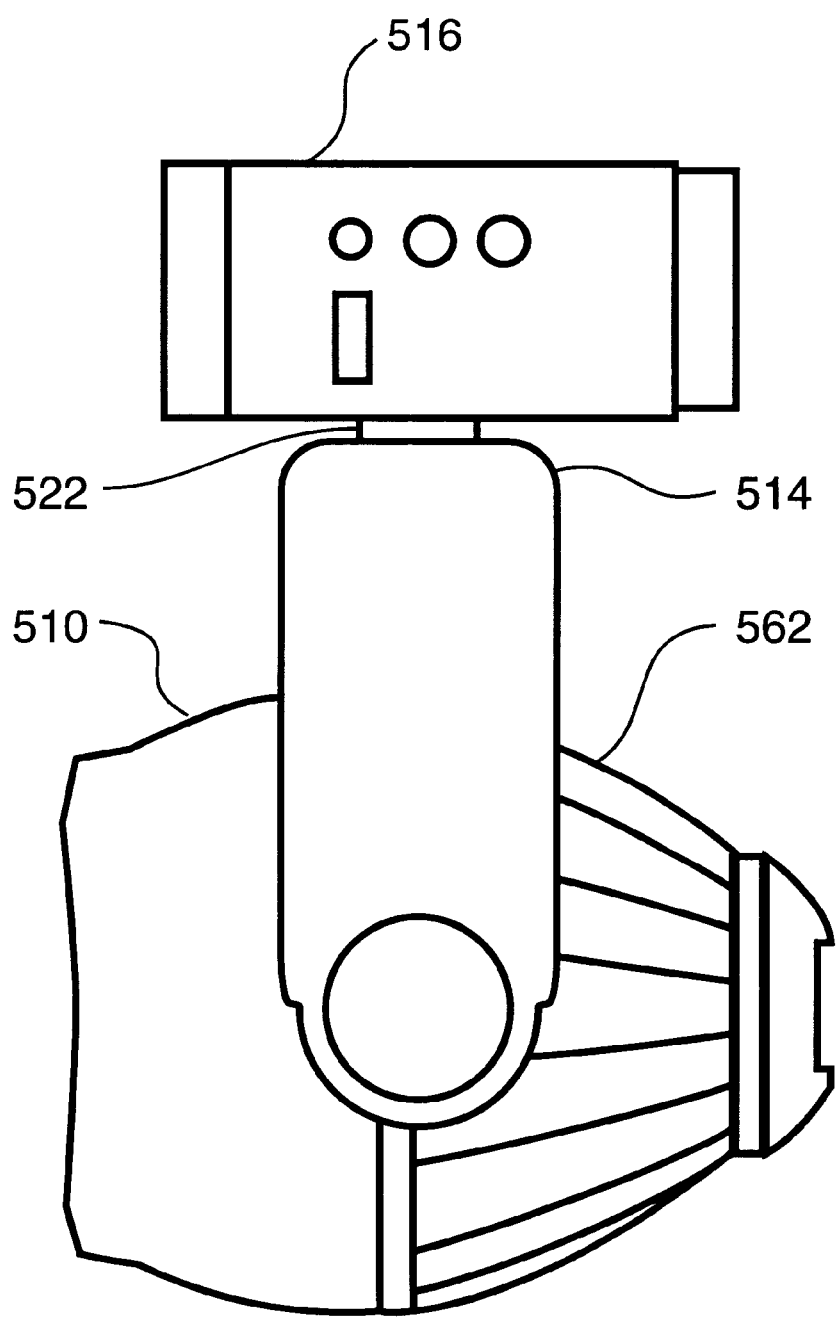
Figure 14:
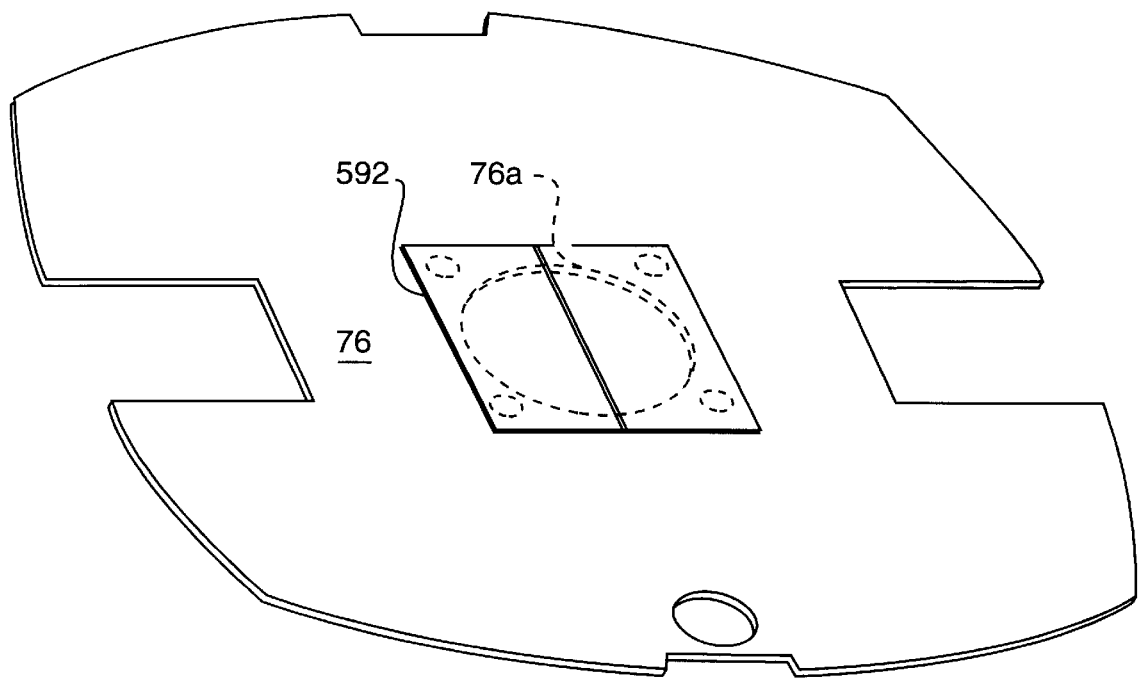

FIGS. 10, 11, and 12 are perspective views illustrating an embodiment of the diffusing dimmer device of the present invention;

FIG. 13 is a side elevation view illustrating another embodiment of the luminaire of this invention; and FIG. 14 is a perspective view illustrating an embodiment of the hot plate and ultra violet filter of this invention.

DETAILED DESCRIPTION OF THE INVENTION

The present invention can employ a gas discharge lamp, preferably a Philips model MSR 575, metal halide lamp. A halogen lamp, which may also be used, has the advantage of controlled dimming but the disadvantage of more heat output than the gas discharge lamp. Although the gas discharge lamp does not have controlled dimming, mechanical dimming can be used. Advantageously, the gas discharge lamp is more efficient than the halogen lamp by providing more light per watt and has less heat output than the halogen lamp.

It has been found, according to this invention, that mechanical dimming can be achieved to change light intensity and improve the uniformity of the dimming effect. This is accomplishing by non-transparent flags which have edge portions formed of a frost material which diffuses the light and improves the uniformity of the dimming effect. This diffuses or redistributes the light passing through the frost material in combination with the non-transparent flags. An uneven tooth-like edge on the flags, gradually transitions the diffusion effect until full blockage of the light occurs when the flags close completely.

Figure 1:
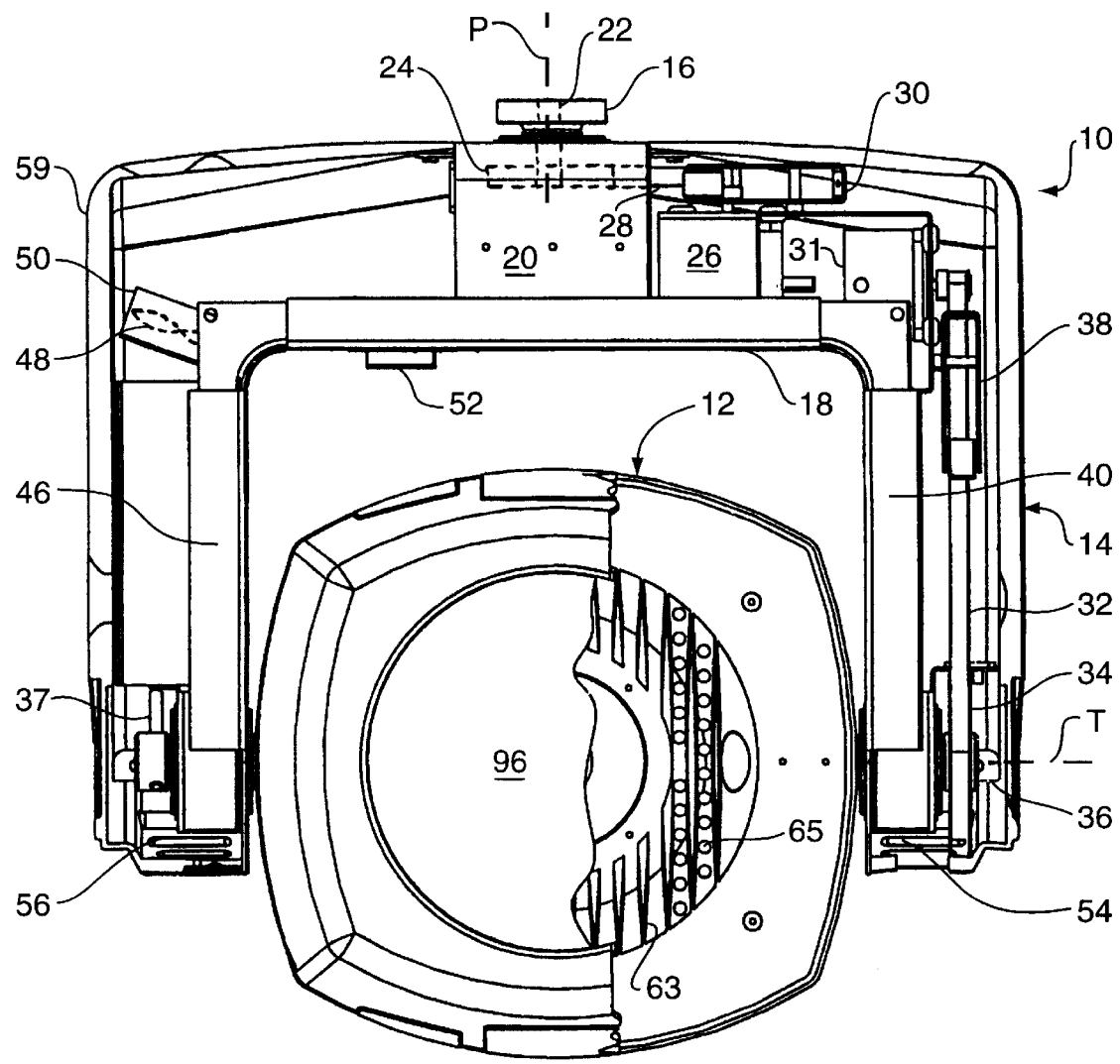
FIG. 1 is a frontal view, with partial cutaway portions, illustrating an embodiment of the luminaire of this invention.
Figure 2:
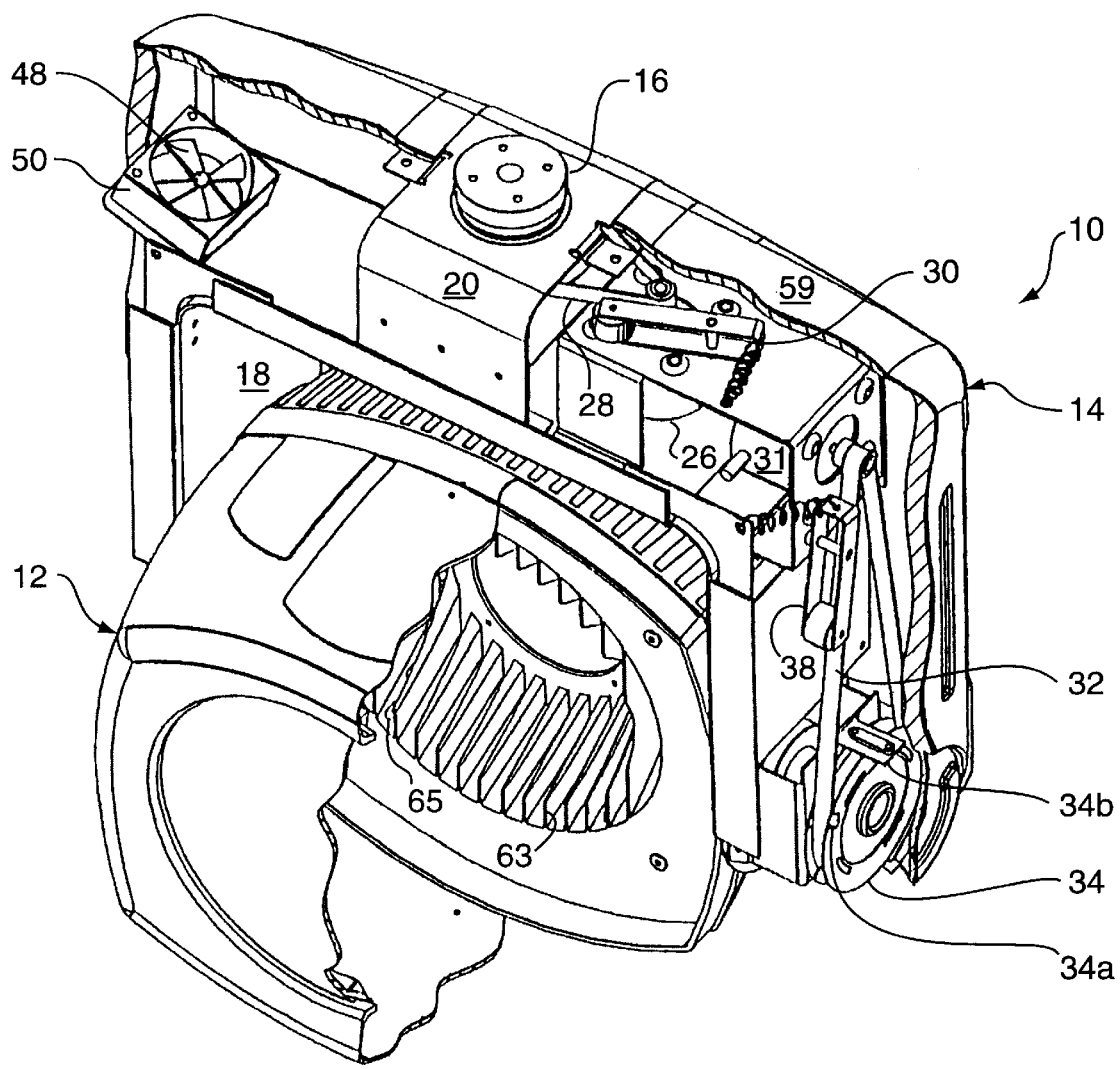
FIG. 2 is a perspective view, with partial cutaway portions, illustrating an embodiment of the lunminaire of this invention.

Referring now to the drawings, FIGS. 1 and 2 illustrate the wash luminaire of the present invention, generally designated 10. Luminaire 10 comprises a housing 12 connected to a yoke 14 which may be suspended from a supporting truss (not shown) by means of a clamp (also not shown) attached to yoke 14 at connector 16.

Yoke 14 comprises a suitable metal frame 18 including a metal bracket 20 to reinforce yoke 14. Connector 16 is bearing mounted and connected by means of a shaft 22 to a gear 24 positioned adjacent bracket 20. Gear 24 includes a notch (not shown) which operates with an adjacent position sensor (not shown) for pan position control. A motor 26, supported by frame 18, drives belt 28 to rotate gear 24 for the purpose of providing a 360 degree rotation about the centroidal axis P of shaft 22. This provides the pan capability to luminaire 10. A suitable idler arrangement 30 is provided to engage belt 28.

Another motor 31, also supported by frame 18, drives belt 32 to rotate gear 34 for the purpose of providing at least a 270 degree rotation about the centroidal axis T of a shaft 36. Similar to gear 24, gear 34 includes a notch 34a which operates with an adjacent position sensor 34b for tilt position control. This provides the tilt capability to luminaire 10. Another suitable idler arrangement 38 is provided to engage belt 32. A travel stop 37 is connected to the tilt mechanism to limit movement of luminaire 10 to a desired tilt angle.

A manual off-on switch or breaker 52 is also mounted externally on yoke 14. A cooling fan 48 mounted in a housing 50 is operable to draw cooling air into yoke 14 through a plurality of vents 54, across the internal components of yoke 14, and outwardly through a similar plurality of vents 56. A cover 59, formed of a rigid synthetic material, which includes vents 54 and 56, encloses yoke 14 and the above described components.

Figure 3:
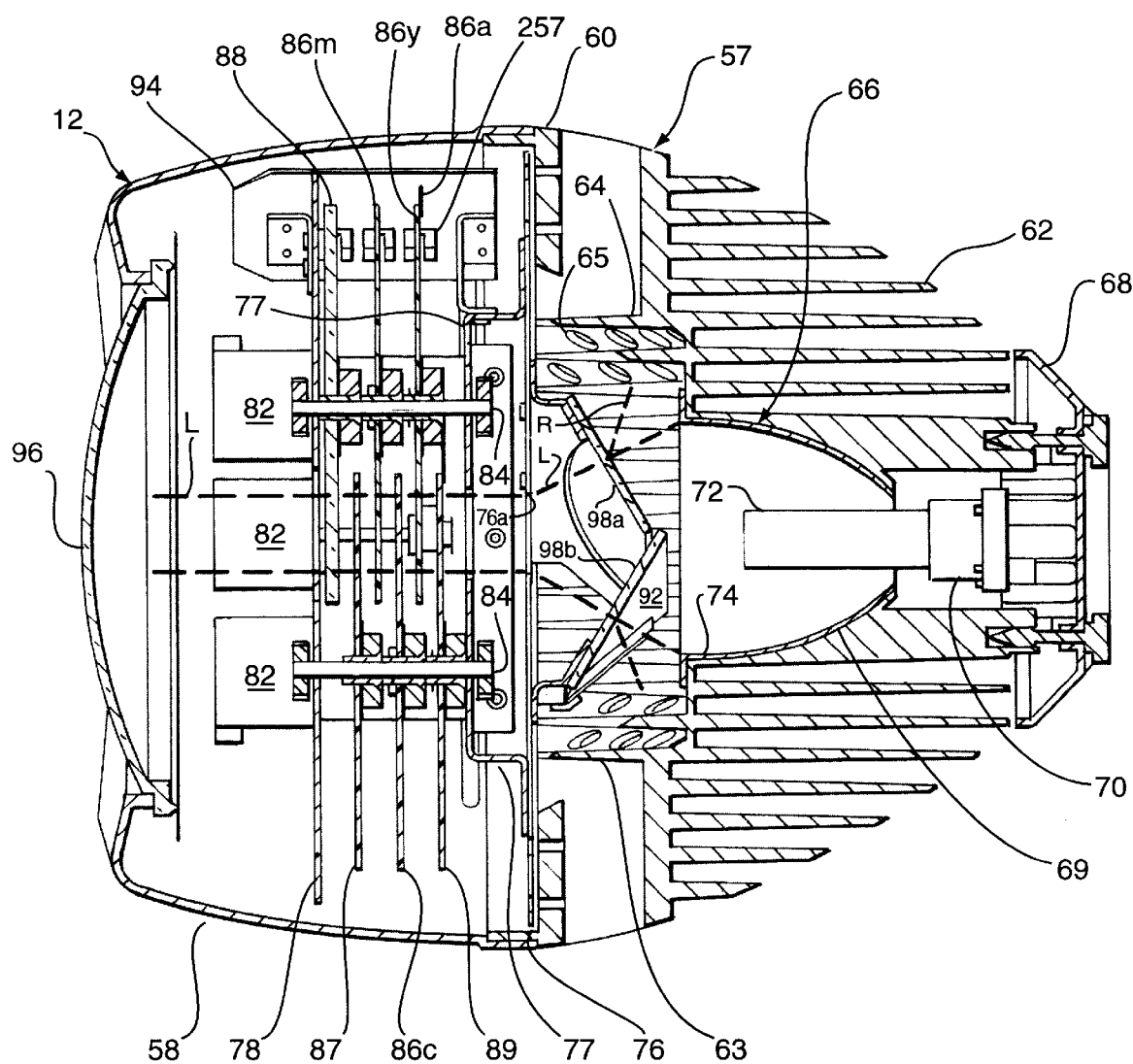
FIG. 3 is a cross-sectional view, illustrating an embodiment of the housing of this invention.
Figure 4:
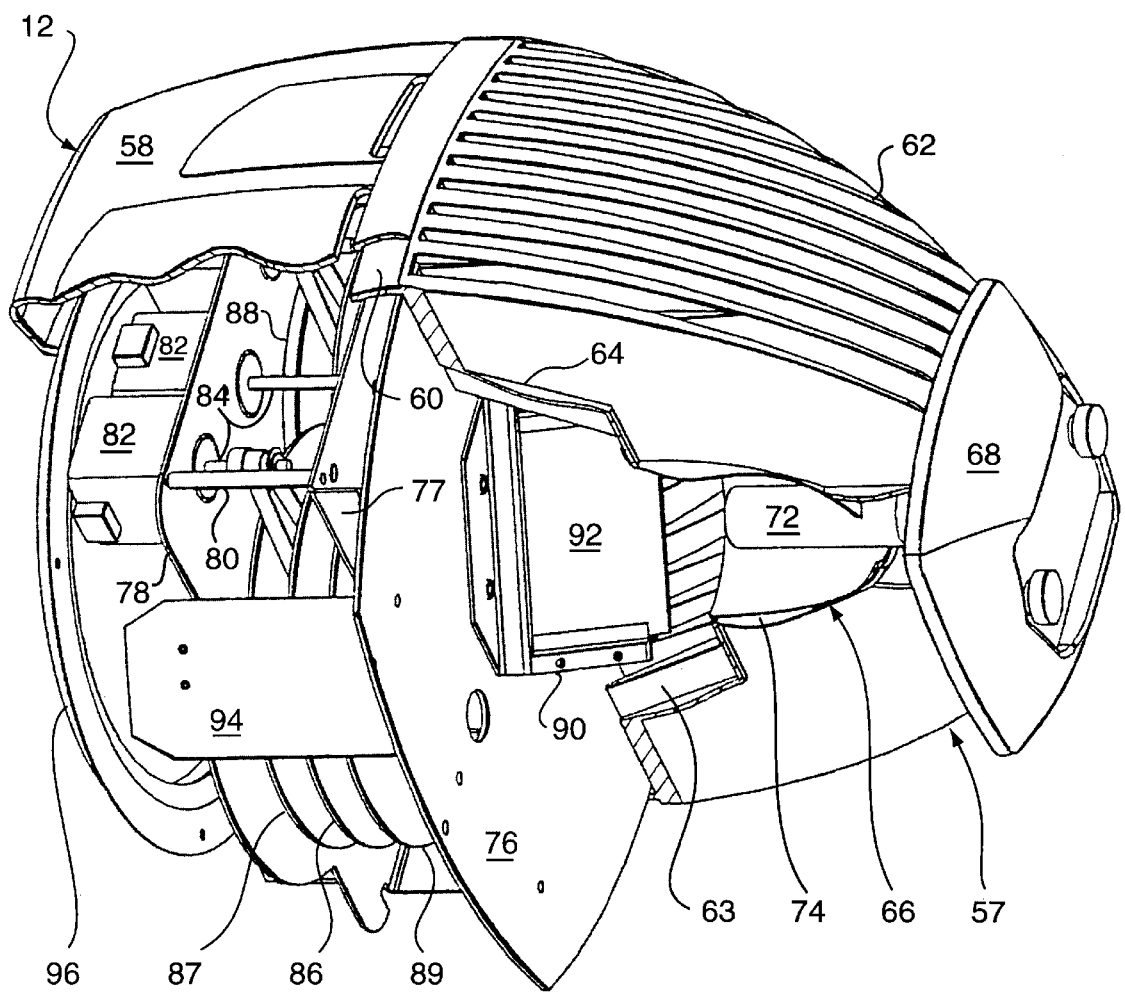
FIG. 4 is a perspective view, with partial cutaway portions, illustrating an embodiment of the housing of this invention.
Figure 5:
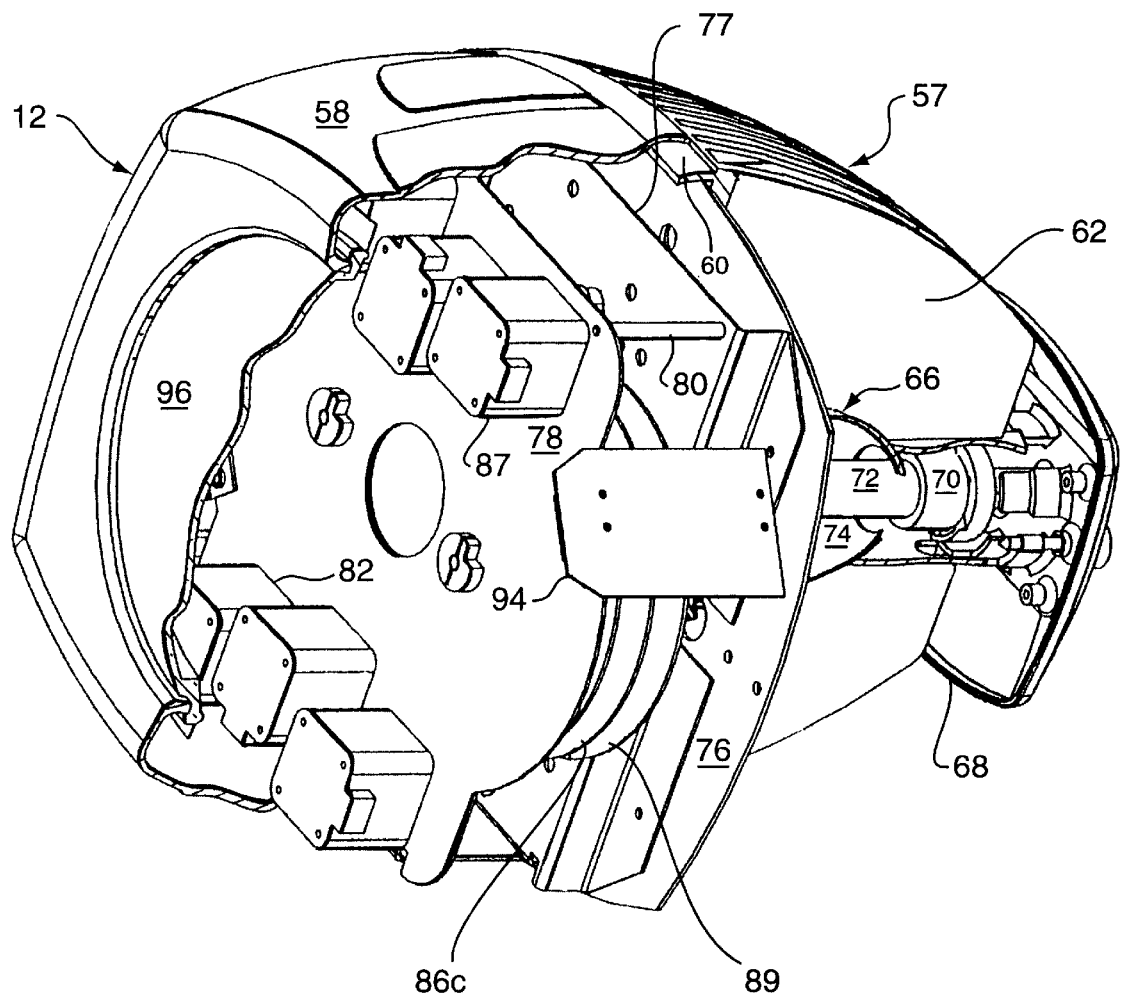
FIG. 5 is another perspective view, with partial cutaway portions, illustrating an embodiment of the housing of this invention.

In FIGS. 3, 4, and 5, housing 12 is illustrated and generally comprises an aluminum casting 57 and a bezel 58, formed of a suitable rigid synthetic material. Casting 57 includes a base 60, at a first end, from which a first plurality of contoured external cooling fins 62 extend. A stepped annular relief 66 is provided within casting 57 and includes an annular portion 64 and a truncated elliptical portion 69. Annular portion 64 also includes cooling vents 65. A second plurality of internal cooling fins 63 are disposed about an inner annular periphery of annular portion 64. First and second fins 62, 63, respectively, are aligned.

An aluminum end cap 68 is mounted on a second end of casting 57. A lamp base 70 and lamp 72 are mounted on end cap 68. Lamp 72 extends into open annular relief 66. An elliptical reflector 74 is also mounted in elliptical portion 69 so as to suitably surround lamp 72. Lamp 72 is powered by AC power in a conventional manner.

An aluminum heat blocking wall, or hot plate 76, is mounted on the first end of casting 57, and is spaced from a motor mounting plate 78 by spacer elements 80. A support plate 77 is mounted adjacent hot plate 76. A plurality of motors 82 are mounted on motor mounting plate 78 and rotating shafts 84, extending from motors 82, are operable to be belt driven to rotate a plurality of staggered color filters 86, a pair of overlapping, staggered lenses 87, 88 and a conventional color wheel 89. Tabs, such as tab 86a, on color filter 86, are provided on these shaft mounted, rotating lenses, filters, etc., to operate with a plurality of respective adjacent position sensors 257 mounted on a pair of motor/driver sensor boards 94 mounted between plates 77, 78 for the purpose of sensing the positions of each of the shaft mounted rotating devices including color filters 86, etc.

Light beam L, FIG. 3, is condensed to a diameter of about 1.25 inches in diameter where it exits casting 57 at an opening 76a in hot plate 76 and passes through an opening 77a in plate 77. The beam then passes through the series of wheels, color filters, lens, etc. In the embodiment of FIG. 3, bezel 58 houses a series of 6 wheels. Color wheel 89, dichroic coated color filter (yellow) 86y, dichroic coated color filter (cyan) 86c, dichroic coated color filter (magenta) 86m, and lenses 87 and 88. Three of these wheels are mounted on shaft 84 and another three are mounted on a corresponding shaft 84. The 2 sets of 3 wheels are interleaved, i.e. partially overlapped, in known fashion, to optimize the number of surfaces exposed to beam L. The positions of the three wheels on one shaft 84 are sensed by their respective sensors 257 on one of the boards 94, and the positions of the other three wheels on the other shaft 84 are similarly sensed by their respective sensors 257.

Figure 6:
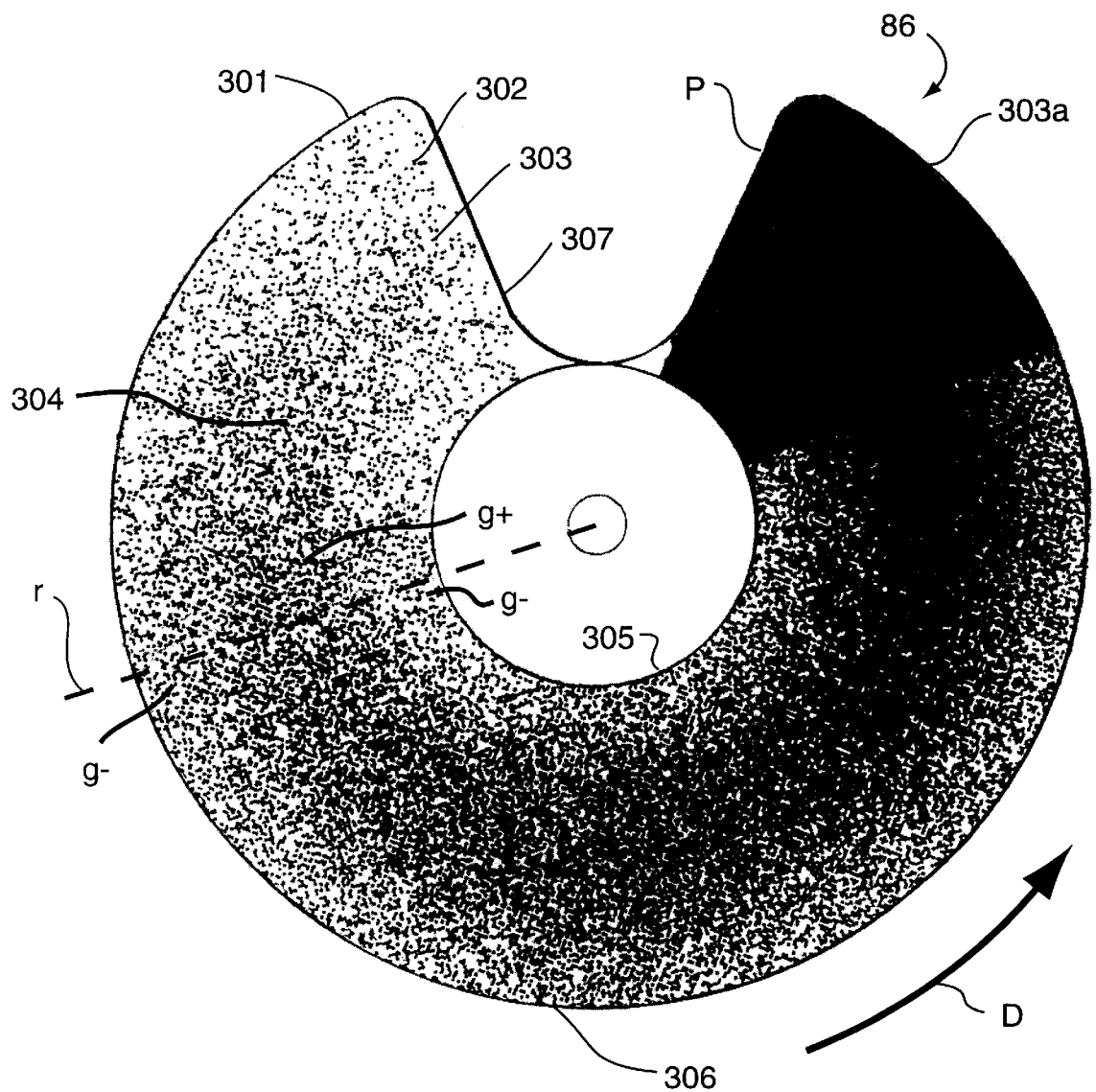
FIG. 6 is a plan view illustrating an embodiment of the color filter of this invention.

Color filters 86y, 86c and 86m, FIG. 6 comprise a disc-shaped borosilicate glass substrate 301 having a planar surface 302 which includes a photolithographically etched film 303 deposited thereon. Film 303 forms a Gausian pattern arcuate band 304 extending around a substantial portion of planar surface 302. Band 304 has an inner edge 305 and an outer edge 306 and the density of film 303 is greater in an area designated g+ along a radius r between inner edge 305 and outer edge 306 and less in an area designated g− along radius r at inner edge 305 and less in a corresponding area g− along radius r at outer edge 306. A portion of substrate 301 is cut away to form a notch 307 which interrupts arcuate band 304. A portion p of planar surface 302 adjacent notch 307 is coated with a solid film 303a having no pattern as on the etched film 303 in band 304.

Color filters 86y, 86c and 86m are used in combination with lamp 72 to produce desired color effects. Beam L, produced by lamp 72 is circular and, has a typical power gradient, which is not uniform across the beam. A ratio of power from the center of the beam to beam edge is often on the order of 50%. Known variable density filters which do not address the power gradient of the beam, produce results which are non-uniform and leave an apparent white spot in the center of the beam while darkening the beam edge which makes the coloration objectionable.

Advantageously, the Gausian patterning of the color filters of this invention is coincident with the inverse of the power gradient of the beam L. That is, the color filter gradient is greatest toward the center of the band 304 where it crosses the maim power point of the beam L. In this manner, the maximum power of the beam L is coincident with the maximum filtering effect of filters 86y, 86c and 86m.

Saturation of the Gausian color pattern increases proportionally as the filter is rotated in a direction represented by directional arrow D, FIG. 6, culminating in 100% saturation at about 300 degrees of angular travel where portion p of planar surface 302 is coated with solid film 303a.

If it is desired, a bracket 90 is mounted on hot plate 76 to position a heat filter 92 to reflect IR radiation R back to the cooling fins 63, 62 to be dissipated from housing 12. Heat filter 92 comprises the bracket 90, FIGS. 3 and 4, which is generally of an A-frame construction and includes a first filter 98a mounted at about a ninety degree angle relative to a second filter 98b. Filter 92 is used to reflect damaging infrared radiation R away from the previously mentioned heat sensitive optical components mounted on shafts 84. Thus, these filters are at an angle to light beam L passing therethrough. The result is a reflection of IR radiation outwardly toward the fins, as is best shown in FIG. 3. First and second filters 98a, 98b, respectively are preferably formed of a suitable 1.75 mm thick substrate of borosilicate glass material and has a thin film dichroic coating on both sides. The coating on one side facing lamp 72, will provide infrared reflectance of from about 730 nm to about 1,050 nm. The coating in the opposite side will provide reflectance of from about 1,050 nm to about 1,700 nm.

Heat filter 92 can be eliminated. However, preferably a filter for blocking ultra violet rays from reaching the color wheels and their drive systems may be utilized. Such a filter 592, FIG. 14, may take the form of a borosilicate glass material positioned between the lamp and the color wheels. For example, the filter may be suitably mounted on hot plate 76 in place of heat filter 92 in position to filter light beam L before it passes through opening 76a in hot plate 76, FIGS. 3 and 14. Mixing assembly 75, which is that portion of the luminaire 10 mounted between plates 77 and 78, includes a mechanical diffusion dimmer device comprising a pair of dimmer flags 71 and 73, FIGS. 10, 11 and 12, pivotally mounted on plate 77. Flags 71, 73 are operable to open and close in a shutter-type motion and overlap when in the fully closed position. Rapid movement of the flags 71, 73 between open and close, produces a strobing effect.

Flags 71, 73 include an opening 71g, 73g at one end for receiving a pair of shafts 71a, 73a, respectively. A suitable fixed attachment secures flags 71, 73 to shafts 71a, 73a. Shafts 71a and 73a are motor driven to rotate and pivot flags 71 and 73, respectively, between an open position A, limited by stops A' and a closed position B, illustrated in phantom in FIG. 11, limited by stops B'. In position B, flags 71, 73 completely block passage of light beam L through opening 77a. Each flag 71, 73 is formed of a reflective, non-transparent material, preferably a stamped aluminum arm 71b, 73b, attached to shafts 71a, 73a in a staggered arrangement so that when flags 71 and 73 move to closed position B, they overlap each other. Flags 71, 73 have edges 71c, 73c, which are scalloped into a sawtooth or similar shape, and include diffuser edge portions 71d, 73d formed of a frost material, preferably a borosilicate glass, which diffuses light passing therethrough and improves the uniformity of the dimming effect. Edge portions 71d, 73d are suitably attached to arms 71b, 73b by aluminum tabs, extending from arms 71b, 73b, which for purposes of illustration are only illustrated at 73e on arm 73b, FIG. 12. Edge portions 71d, 73d overlay scalloped edges 71c, 73c and extend outwardly therefrom, terminating at another scalloped, or similar edge 71f, 73f formed in the diffusing material.

Figure 7A:
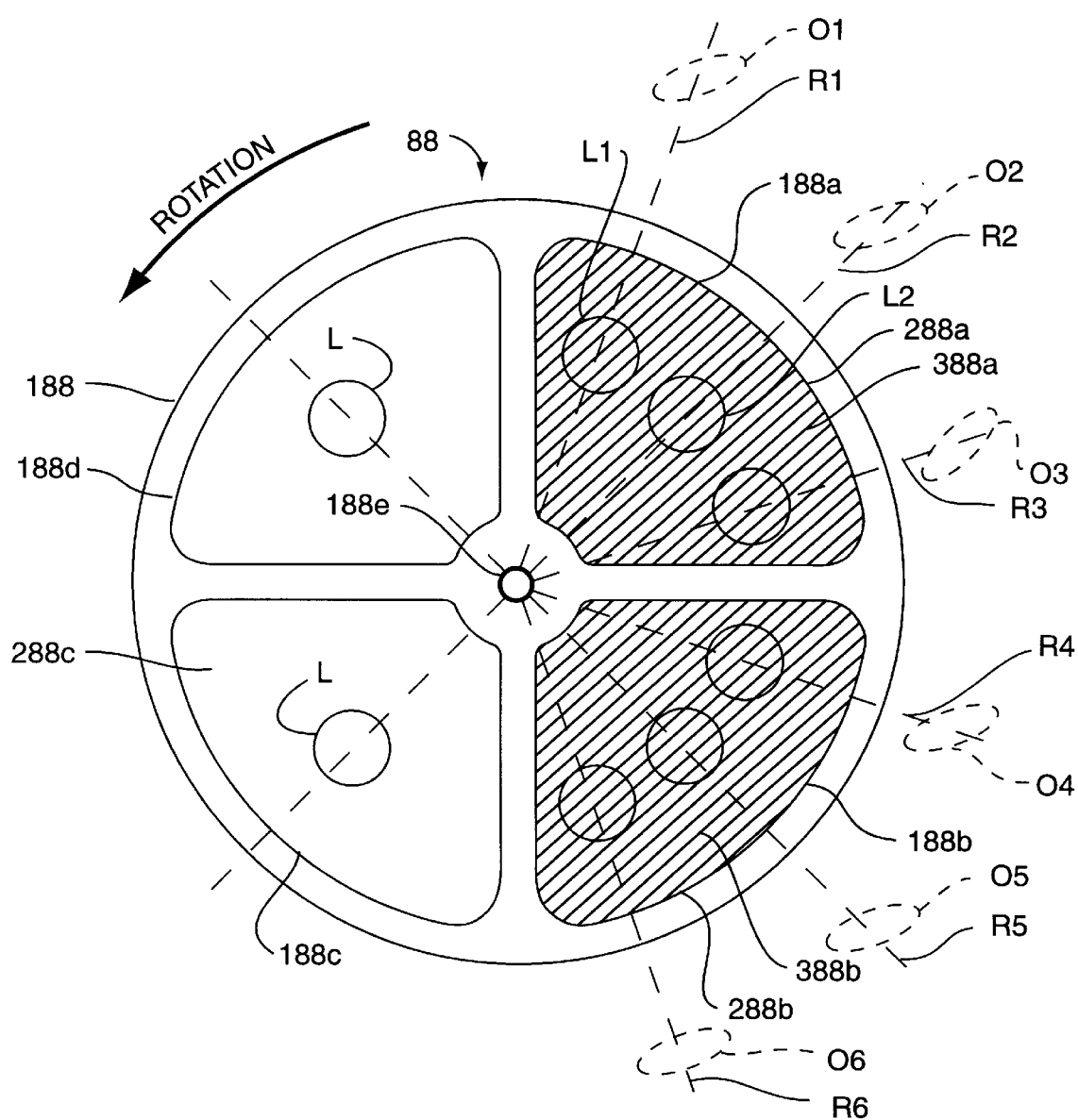
FIG. 7A is a planar view illustrating an embodiment of the rotatable lenticular lens device of this invention.

A lenticular lens device 88, FIG. 7A is rotatably mounted adjacent one side of motor mounting plate 78. Lens device 88 is mounted on one of the shafts 84 which is rotatably driven by one of the motors 82 suitably attached on another side of motor mounting plate 78. Lens device 88 comprises a disc shape and is formed of an aluminum or other suitable metal retainer 188 having a plurality of openings 188a, 188b, 188c, 188d formed therein. An aperture 188e in the geometric center is for receiving shaft 84 whereby lens device 88 is rotatable. One of the openings 188a includes a lenticular lens element 288a formed of a suitable high temperature glass having a plurality of substantially parallel radially extending grooves or lenticules 388a formed therein. Another of the openings 188b includes substantially the same lenticular lens element 288b but having the grooves or lenticules 388b oriented at 90 degrees relative to lenticules 388a. Lenticular lens elements 288a and 288b will change the geometric shape from a circular to an elongated ellipsoidal shape. Still another of the openings 188c includes either a suitable well know frost material 288c, FIG. 7A, which will diffuse and soften the beam L and spread out the beam angle but will not affect the geometric shape of the beam. The last of the openings 188d remains open and contains no lens element so that the light beam passing there through retains its normal light pattern having a circular cross-sectional geometry. The lens elements 288a, 288b, 288c or 488c may be fixedly secured to retainer 188 by a suitable high temperature silicone based adhesive or may be removably secured by some suitable attachment device.

Figure 7B:
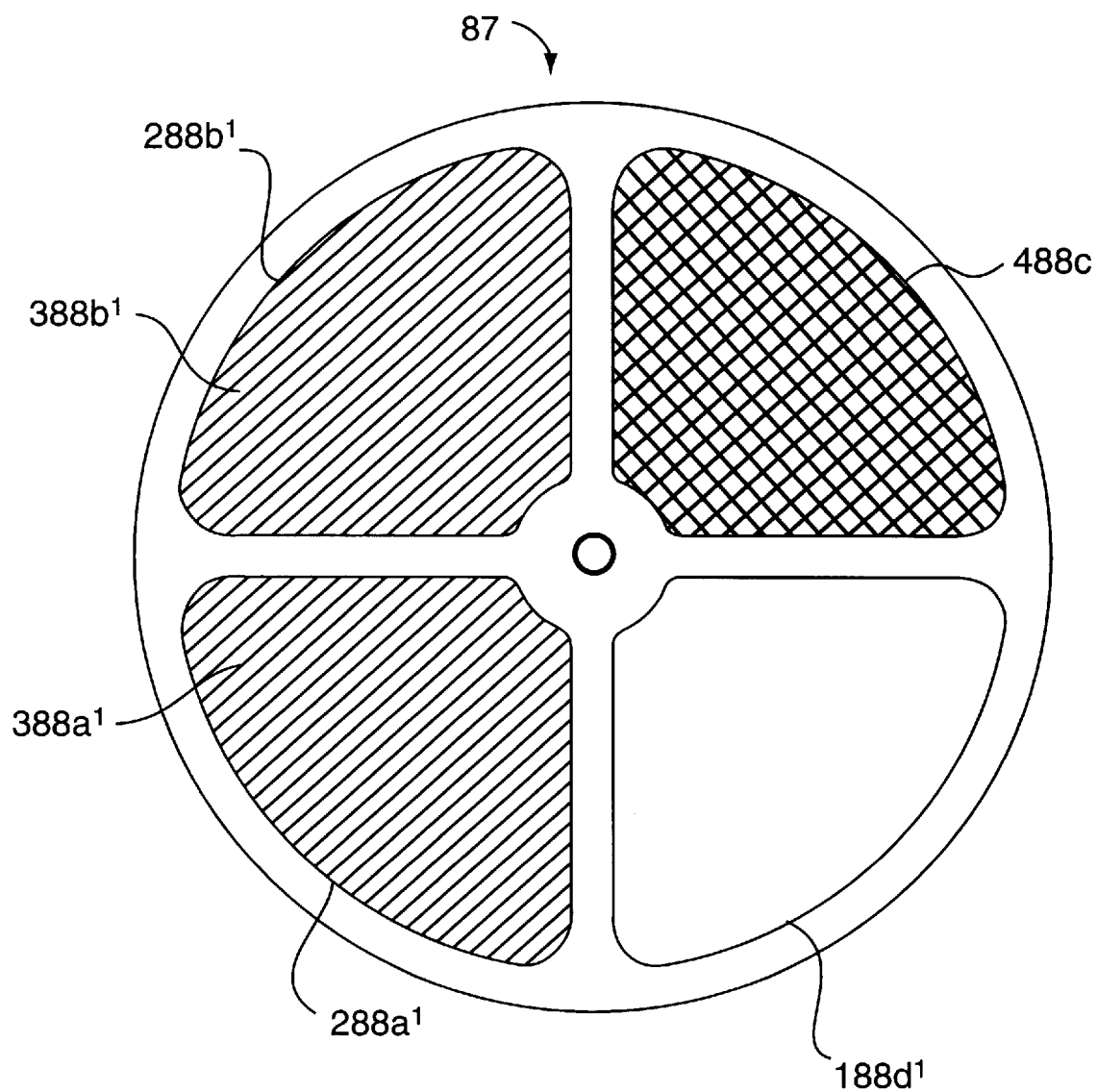
FIG. 7B is a planar view illustrating an embodiment of another rotatable lenticular lens device of this invention.

Another lenticular lens device 87, FIG. 7B is rotatably mounted similar to device 88 but staggered to overlap device 88. Lens device 87 is similar in construction to device 88 except that a homogeneous lens element 488c is provided in place of the frost material 288c of device 88. As it is known, the homogeneous lens element 488c includes an array of adjacent convex surfaces which function to change the magnification and increase the beam angle but will not affect the geometric shape of light beam L. As a result, lens device 87 includes a lenticular lens element 288a' having a plurality of substantially parallel radially extending grooves or lenticules 388a' formed therein and lenticular lens element 288b' having grooves or lenticules 388b' oriented at 90 degrees relative to lenticules 388a'. Homogeneous lens element 488c is provided instead of frost and 188d' remains open.

In FIGS. 7A and 7B lens devices 87, 88 are illustrated. When the device 88 is mounted in fixture 10 for rotation on shaft 84 engaged in aperture 188e, a fixed beam of light L passes through lens device 88 as the device 88 is rotated. When opening 188d is in the path of beam L, there is no affect on the beam since there is no lens in opening 188d. When device 88 is rotated to a position where frosted lens 288c interrupts beam L, the beam angle is affected but the geometric shape of beam L is unchanged. However, when lenticular lens elements 288a and/or 288b interrupt the beam L, the normally projected circular geometric shape of beam L is changed to an oblong or ellipsoidal shape O as illustrated in phantom in FIG. 7A. Furthermore, as the lens device 88 is rotated through fixed beam L, the oblong shape of beam O changes in orientation.

For purposes of illustration only, several radii are shown in FIG. 7A and extend outwardly through six different positions where rotating lens device interrupts fixed beam L. In a first position the orientation of altered beam O1 on radius R1 is aligned with the direction of lenticules 388a as they extend across beam L1 which remains fixed. As viewed in FIG. 7A, the oblong projected beam O1 is slightly canted to the right with reference to radius R1. In a second position, the orientation of altered beam O2 on radius R2 is aligned with the direction of lenticules 388a as they extend across fixed beam L2 which is actually in the same fixed position as the beam designated L or L1. As viewed in FIG. 7A, the longitudinal axis of the projected beam O2 is vertically aligned with reference to radius R2 and as the lens device 88 is further rotated, the oblong projected beam O3, O4, O5 and O6 constantly changes orientation in the direction of rotation with reference to its respective radii R3, R4, R5 and R6 due to the changing orientation of lenticules 388a and 388b extending across the fixed light beam.

With the foregoing orientation description in mind, it can be appreciated that the overlapping lens devices 87, 88 provide a wide variety of beam shapes including combinations of beam shapes heretofore not available. The combinations include circular and ellipsoidal beam shapes with or without frost, with or without increased beam angle, or with overlapping ellipsoidal beam shapes wherein the ellipsoidal beam shape provided by one lenticular lens element can extend in a longitudinal direction which is angularly disposed relative to the longitudinal direction of the ellipsoidal beam shape provided by another lenticular lens element of an overlapping lens device. This unique combination provides enhanced lighting effects not previously available.

Figure 8:
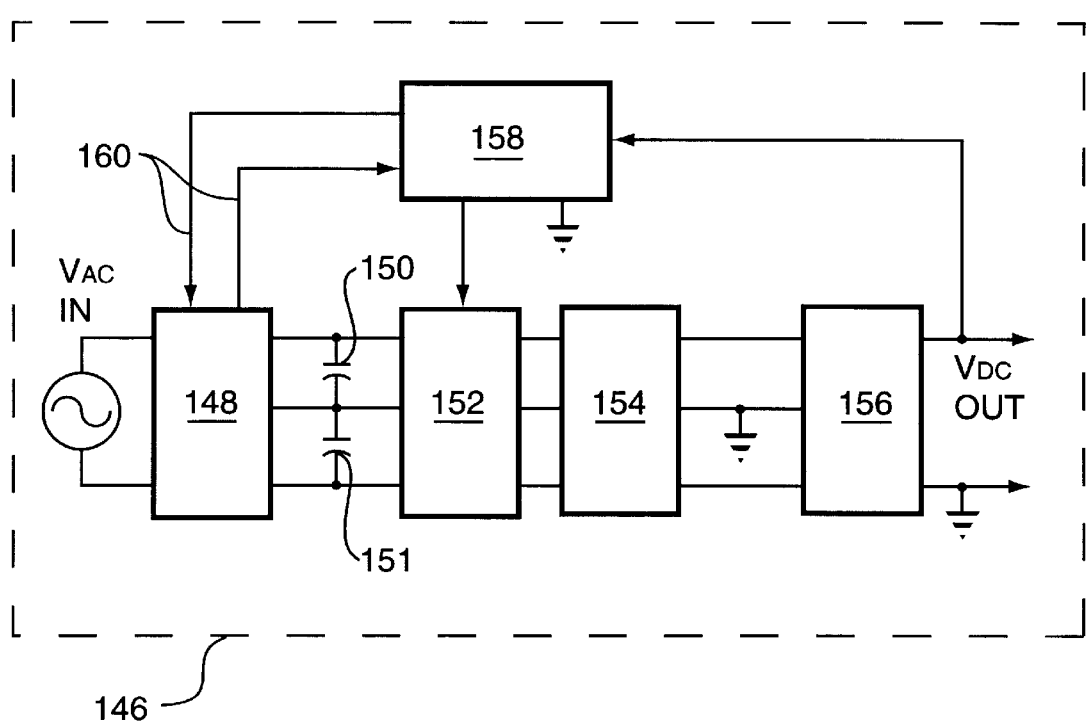
FIG. 8 is a diagrammatic view illustrating an embodiment of the power board of this invention.

Also included in yoke 14 is a power supply board 146, best shown in FIG. 8, mounted behind a portion designated 46 of metal frame 18. Power supply board 146 is the motor and logic power supply for movement of luminaire 10. Power supplied to board 146 may be 100 to 240 VAC (50/60Hz). A voltage selection rectification 148, changes AC to DC voltage and operates to double the voltage if less than 150 VAC. Output is stored in capacitors 150, 151 and then a half bridge 152 switches the DC back to AC voltage at 40 kHz. The 40 kHz goes into a transformer 154 which steps the voltage down and isolates the live voltage from the low voltage output circuit. The AC voltage is rectified back to DC voltage and filtered via an inductor-capacitor arrangement at 156. A voltage mode, pulse width modulator controller 158 is responsible for the feedback of the output voltage and controls the half bridge 152 to produce a constant output voltage. Also, a voltage sensor for doubler circuit control is provided at 160.

Figure 9:
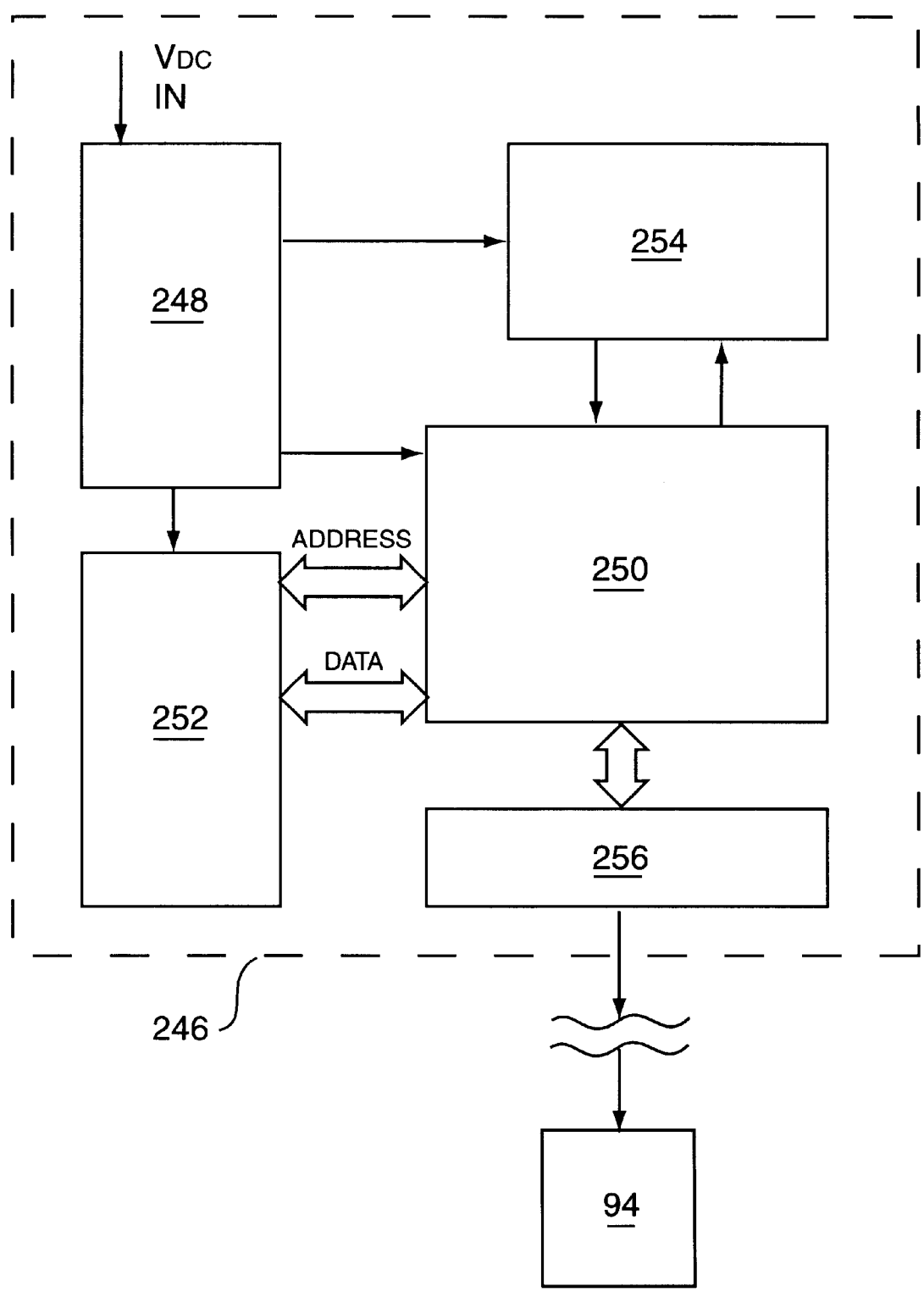
FIG. 9 is a diagrammatic view illustrating an embodiment of the logic board of this invention.

A logic board 246, best shown in FIG. 9, is mounted in yoke 14 behind a portion designated 40, of metal frame 18. The logic board is operably connected to a controller and controls the above-mentioned pan and tilt, and also controls color wheels, etc., and other operable components of the luminaire 10. Power from power board 146 is fed to logic board 26 at from about 9VDC to about 40VDC through a voltage regulator circuit 248. The power is then communicated to a commercially available embedded microprocessor 250. The power is also communicated to a memory block 252 which comprises 3 different types of memory including Static RAM, Flash ROM and EPROM. The memory 252 is utilized by the microprocessor 250 to perform read/write operations on the code and data stored in the 250 memory which signals pan and tilt commands to luminaire 10. A serial transceiver 254 provides RS 485 compatible signals to industry standard USITT DMX512 controllers and exchanges (receives and transmits) information with microprocessor 250. A slave serial module 256 receives information from microprocessor 250 and serializes data received and sends it out over 5 wires to slave modules including motor driver/sensor boards 94 which include infrared photo interrupter sensors 257, FIG. 3, which respond to tabs and/or notches on component parts of luminaire 10 such as notch 34a formed in gear 34, FIG. 2 or tab 86a on color filter 86, FIG. 3, which tells the microprocessor 250 the initial (zero or homing) position of motors 26, 82, respectively. The serial module 256 retrieves the position information from sensors 257 and sends it to the microprocessor 250 which determines whether to continue to move the filter or gear or to look for the tab/notch.

Another arrangement is illustrated in FIG. 13, and includes a fixture housing 510, a yoke 514 and an electronic housing 516. In this arrangement, power board 146 and logic board 246, FIGS. 8 and 9, are positioned in electronics housing 516. Also, in housing 516 are the previously described motor 26, belt 28 and gear 24 arrangement, see FIG. 1, for driving the 360 degree pan position control which rotates housing 510 about centroidal axis P of shaft 522 which interconnects yoke 514 and electronics housing 516. No fan such as fan 48, described previously as being positioned in yoke 14, and cooperative vents 54, 56, are needed with removal of the electronics including logic board 246 and power board 146 from the yoke. The previously described tilt mechanism, see FIG. 1, including motor 31, belt 32 and gear 34, would however remain in the yoke to provide the 270 degree rotation. Housing 510 may also include contoured, radially directed cooling fins 562 formed as part of aluminum casting 557.

A stationary lens 96, is mounted in bezel 58, best shown in FIG. 1. Lens 96 is a common light diffusing lens similar to a lens used in an automotive headlight. Such lenses are commercially available. The above described combination of overlapping, rotating lenses 87, 88 and stationary lens 96 provide a beam angle which is preferably from about 10 degrees to about 60 degrees. This can be varied by rotation of lenses 87, 88 and enhanced by interchanging a selected diffusing lens 96.

While this invention has been illustrated and described in accordance with a preferred embodiment, it is recognized that variations and changes may be made therein without departing from the invention as set forth in the claims.

Having described the invention, what is claimed is:

1. A diffusing dimmer apparatus comprising:
   at least one shutter blade comprising of
      a non-transparent material and having a trailing edge and a first leading edge; and
      a light diffusing material connected to the leading edge of the non-transparent material and extending outwardly from the leading edge to a second leading edge formed in the light diffusing material; and
   shutter actuator whereby the shutter blade is incrementally introduced into a light beam between an open and closed shutter position.

2. A diffusing dimmer apparatus comprising:
   a non-transparent material and having a trailing edge and a first leading edge with a scalloped pattern; and
   a light diffusing material connected to the leading edge of the non-transparent material and extending outwardly from the leading edge to a second leading edge formed in the light diffusing material.

3. A diffusing dimmer apparatus comprising:
   a non-transparent material and having a trailing edge and a first leading edge; and
   a light diffusing material connected to the leading edge of the non-transparent material and extending outwardly from the leading edge to a second leading edge with a scalloped pattern formed in the light diffusing material.

4. The apparatus as defined in claim 2 wherein the leading edge of the light diffusing material also has a scalloped pattern.

5. The apparatus as defined in claim 2 wherein the scalloped pattern is a sawtooth pattern.

6. The apparatus as defined in claim 3 wherein the scalloped pattern is a sawtooth pattern.

7. The apparatus as defined in claim 4 wherein the scalloped pattern is a sawtooth pattern.

8. The apparatus as defined in claim 1 wherein the light diffusing material is a frosted borosilicate glass.

9. The apparatus as defined in claim 2 wherein the light diffusing material is a frosted borosilicate glass.

10. The apparatus as defined in claim 3 wherein the light diffusing material is a frosted borosilicate glass.

11. The apparatus as defined in claim 4 wherein the light diffusing material is a frosted borosilicate glass.

12. The apparatus as defined in claim 5 wherein the light diffusing material is a frosted borosilicate glass.

13. A diffusing dimmer apparatus comprising:
   a flag further comprised of
      a non-transparent material and having a trailing edge and a first leading edge;
      a light diffusing material connected to the leading edge of the non-transparent material and extending outwardly from the leading edge to a second leading edge formed in the light diffusing material; and
   an actuator to place the flag into and out of a light beam so that the second leading edge is the first portion of the flag to enter the light beam and the last portion of the flag to exit the light beam.

14. The diffusion dimmer apparatus of claim 13 comprised of two flags similarly constructed flags whose second leading edge face each other and enter the light beam from different sides of the light beam.

15. The diffusion dimmer apparatus of claim 13 wherein both flags are driven by a single actuator.

16. The diffusion dimmer apparatus of claim 13 wherein each flag is driven by an independant actuator.

17. The diffusing dimmer apparatus of claim 13 wherein the actuator is a motor which is attached to the flag by a pole so that when the motor is rotated the flag enters or exits light beam.

18. The diffusion dimmer apparatus of claim 17 wherein their are a plurality of similarly constructed flags.

19. A light fixture comprising:
   a diffusing dimmer apparatus comprising:
      a flag further comprising of
         a non-transparent material and having a trailing edge and a first leading edge;
         a light diffusing material connected to the leading edge of the non-transparent material and extending outwardly from the leading edge to a second leading edge formed in the light diffusing material;
   an actuator to place the flag into and out of a light beam so that the second leading edge is the first portion of the flag to enter the light beam and the last portion of the flag to exit the light beam; and
   a communications system for directing the motor to position the flag, as desired, relative to the light beam from a remote location.

20. The lighting fixture of claim 19 wherein there are a plurality of similarly constructed flags.

21. The lighting fixture of claim 19 wherein the second leading edge has a peak in the center directed to pass through the center of the light beam.

* * * * *